Sept. 11, 1934.  A. BARÉNYI  1,972,971
RETARDING DEVICE FOR GEARS
Filed Jan. 20, 1933  2 Sheets-Sheet 1
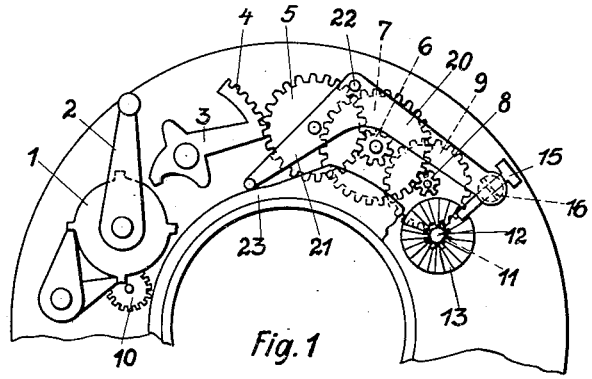
Fig. 1
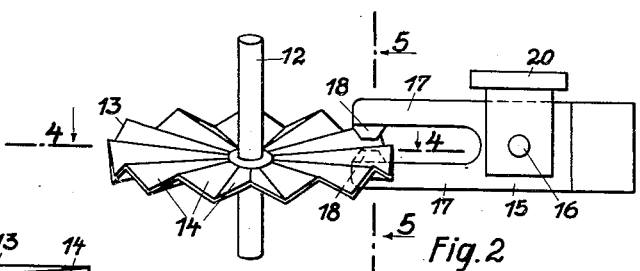
Fig. 2
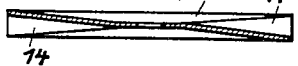
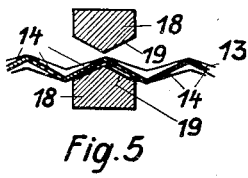
Fig. 4
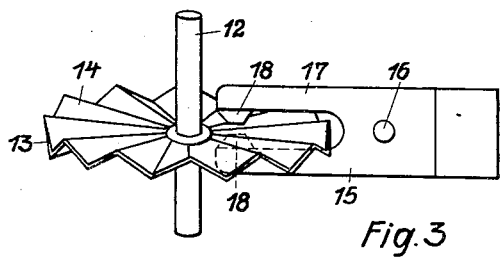
Fig. 3
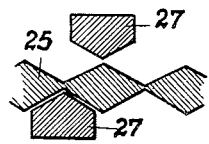
Fig. 6
Inventor:
Árpád Barényi
by
Franz Reinhold.
Attorney.

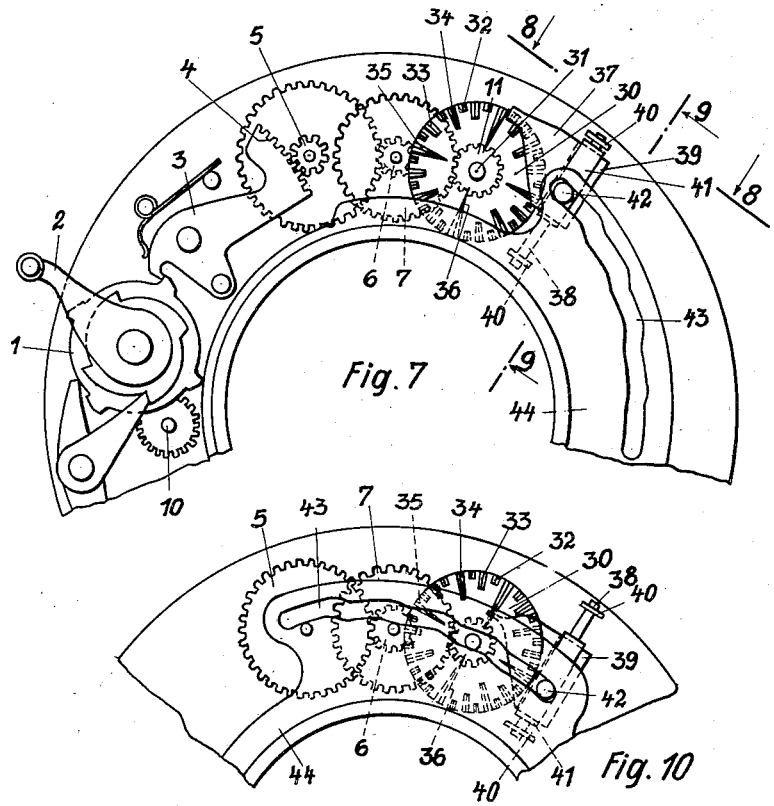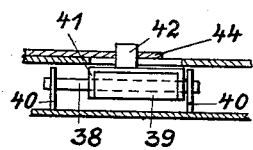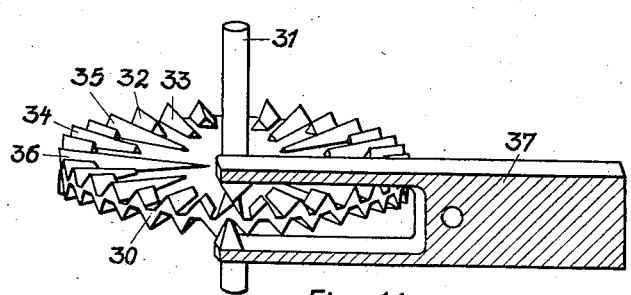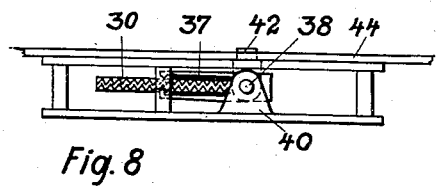

Patented Sept. 11, 1934

1,972,971

UNITED STATES PATENT OFFICE 1,972,971

RETARDING DEVICE FOR GEARS

Árpád Barényi, Berlin-Lichterfelde, Germany, assignor to Voigtländer & Sohn Aktiengesellschaft, Brunswick, Germany, a joint-stock company Application January 20, 1933, Serial No. 652,709
In Germany January 26, 1932

12 Claims. (Cl. 185—46)

My invention relates to improvements in retarding devices for gears and trains of gearing and more particularly in retarding devices for the blade operating mechanism of photographic shutters. In the following the device has been described as used in the said blade operating mechanism, but I wish it to be understood that my invention is not limited to such use. One of the objects of the improvements is to provide a retarding device by means of which the velocity of the train of gearing may be controlled and varied gradually at pleasure and within broad limits, and in which retarding members adapted to be connected to and disconnected from the gearing are dispensed with. With this object in view my invention consists in constructing the retarding device in the form of a rotary member provided at one or both sides with grooves running more or less radially of the member and cooperating with a brake member in the form of an escapement equipped with pallets and adapted by means of its pallets alternately to engage the successive grooves, the said pallet being adapted to be shifted longitudinally of the grooves for varying its position relatively to the axis of the rotary member and for varying correspondingly the retarding action thereof.

For the purpose of explaining the invention several examples embodying the same have been shown in the accompanying drawings in which the same reference characters have been used in all the views to indicate corresponding parts. In said drawings, Fig. 1 is a diagrammatical elevation showing the master member and the blade operating mechanism of a photographic shutter, Fig. 2 is a perspective view showing the retarding device, the brake-member being in the position of greatest retarding action, Fig. 3 is a similar perspective view showing the brake-member in position for small retarding action, Fig. 4 is a sectional elevation of the retarding disk taken on the line 4—4 of Fig. 2, Fig. 5 is a sectional elevation on an enlarged scale taken on the line 5—5 of Fig. 2, Fig. 6 is a sectional elevation similar to the one shown in Fig. 5 and illustrating a modification, Fig. 7 is an elevation similar to the one illustrated in Fig. 1 and showing a modification of the retarding device, Fig. 8 is a fragmentary plan view of Fig. 7 viewed in the direction of the arrows 8—8 of Fig. 7, Fig. 9 is a sectional elevation taken on the line 9—9 of Fig. 7, Fig. 10 is a framentary elevation similar to the one illustrated in Fig. 7 and showing the brake-member of the retarding device in a different position, and Fig. 11 is a perspective view on an enlarged scale showing the retarding disk and the brake-member, the brake-member being shown in section in order to show the construction of the teeth of the retarding disk.

In Fig. 1 I have shown the retarding device as used in combination with the blade operating mechanism of a photographic shutter. The said operating mechanism has been described in the patent of the United States 1,843,265 granted to me February 2, 1932, and a brief description will be sufficient to explain the said mechanism.

As shown the said blade operating mechanism comprises a motor or master member 1 connected with a setting lever 2 and with a gear wheel 10 forming a part of the shutter operating mechanism, a rockable lever 3 cooperating with the motor or master lever and formed with a segmental rack 4 meshing with a gear wheel 5. The gear wheel 5 is in engagement with a pinion 6 rigidly connected with a gear wheel 7, and the said gear wheel is in mesh with a pinion 8 rigidly connected with a gear wheel 9. The gear wheel 9 is in engagement with a pinion 11 secured to an arbor 12, and to the said arbor a disk 13 is secured. As is known to those skilled in the art, the members 3, 4, 5, 6, 7, 8, 9, 11 and 12 comprising a train of gearing for effecting reduction of speed of rotation by the motor 1 of the member that immediately effects the opening and closing movement of the blades.

The disk 13 is formed at opposite sides with radial ribs or teeth 14, and as shown the said teeth are angular in cross-section, and they are provided by pressing the body of the disk 13 alternately at opposite sides into zig-zag form, the depressions being shaped so that the teeth or ribs taper inwardly from the circumference towards the center of the disk. The disk 13 cooperates with a brake-member 15 which is rockingly mounted on a pivot bolt 16, and which is formed with arms 17 straddling the disk 13, the arms 17 of the member being preferably formed with pallets 18 formed with obtuse opposing faces 19 corresponding in shape to the depressions of the disk 13 provided by the teeth or ribs 14. The pivot bolt 16 of the brake-member 15 is mounted on a bell crank lever 20, 21 which is rockingly mounted at 22, and which has its arm 21 engaged by a cam disk 23 rockingly mounted coaxially of the shutter. Thus by shifting the cam disk 23 from the position shown in Fig. 1 to the left the brake-member 15 is shifted from the position shown in Fig. 1 inwardly and towards the arbor 12, as is shown in Fig. 3.

By having the radial ribs or teeth 14 tapering from the circumference of the disk 13 towards the arbor 12 and by gradually reducing the height thereof from the circumference towards the arbor 12, the braking moment and the amplitude of the brake-member 17 are reduced the more the pallets 18 are shifted towards the arbor 12, and the said moment and amplitude are increased by shifting the brake-member 15 outwardly. Thus the braking action of the member 15 upon the disk 13 and upon the gearing connected therewith may be varied within wide limits, and thereby the time of the opening and closing movement of the shutter may be varied.

In the construction shown in Figs. 2 to 5 the teeth or ribs 14 formed on opposite sides of the disk 13 are displaced with relation to each other a distance corresponding to one half of the breadth of the ribs or teeth, and accordingly the pallets 18, 18 are disposed opposite to each other, that is the apices of their opposing faces are located in a plane passing through the axis of the arbor 12, so that the said brake-member is free to rock in either direction. In the modification shown in Fig. 6 the apices of the teeth or ribs 25 are disposed opposite to each other or within a plane passing through the axis of the arbor 12, and therefore the lugs 27, 27 are displaced with relation to each other circumferentially of the disk.

In Figs. 7 to 11 I have shown a modification of the retarding device by means of which the velocity may be varied within broader limits than by means of the device shown in Figs. 1 to 6.

The blade operating mechanism and the speed-reducing gearing connected therewith are similar in construction to the devices shown in Fig. 1, and the same letters of reference have been used to indicate corresponding parts. The speed-reducing gearing is connected with a retarding disk 30 which is formed at its opposite faces with radial teeth or ribs, and at both sides the disk is divided into five concentric zones in which the number of the teeth or ribs is successively reduced from the circumference towards the arbor 31 of the disk, the outermost zone comprising thirty-two teeth, the next zone sixteen teeth, the third zone eight teeth, the fourth zone four teeth and the fifth zone two teeth. In the example shown in the figures the said different numbers of teeth of the zones are provided by having the teeth made different in length. Thus the outer zone comprises sixteen teeth 32 the length of which is equal to the radial breadth of the first zone, while the remaining teeth are extended inwardly. The second zone comprises eight teeth 33 the length of which is equal to the aggregate radial breadth of the first and the second zone and eight teeth which are further extended inwardly, the third zone comprises four teeth 34 the length of which is equal to the aggregate radial breadth of the first, second and third zones and four teeth which further extended inwardly, the fourth zone comprises two teeth 35 the length of which is equal to the aggregate length of the first, second, third and fourth zone and two teeth are extended further inwardly, and the fifth zone comprises the said two teeth 36. In addition between the fifth zone and the arbor 31 a sixth zone is provided which does not contain any teeth. When the brake-member 37 is in position for engagement with the said sixth zone the retarding mechanism is not affected by the brake-member and the braking action is at its minimum.

It will be understood that by thus gradually reducing the number of the teeth in the successive zones the retarding action is reduced by inward movement of the brake-member more rapidly than by means of a disk in which the number of the teeth is alike in all the zones. This change in the retarding action is not continuous any more, as in the example described with reference to Figs. 1 to 6. But such step-by-step variation of intensity of the braking action is desirable for many purposes, and more particularly in connection with photographic shutters, which for practical reasons require adjustability to definite velocities of the shutter operation. By providing the stepwise regulation the velocity may be exactly determined beforehand, so that the following adjustment may be dispensed with.

The brake-member 37 is mounted so that it is tangential to the successive zones in any position to which it may be set, and for this reason it is shiftable on a shaft 38 mounted in bearings 40. As is shown in Fig. 9, the brake-member is formed with an enlarged hub 39 by means of which it is safely guided on the shaft 38, and it is adapted to be shifted in axial direction by means of a U-shaped bail 41 straddling the hub 39 and mounted on the shaft 38. To the said bail a pin 42 is secured which engages in a strapped cam groove 43 made in a setting disk 44 movable circumferentially of the shutter. As shown in Figs. 7 and 10, the cam groove comprises several sections of successively reduced radial distance from the axis of the shutter, and the said radial distance of the sections is such that each section corresponds to the position of the brake-member 37 in engagement with one of the zones of the disk 30.

I claim:

1. A retarding device for gears, comprising a rotary disk formed on its surface disposed transversely of the axis of the disk with a concentric series of teeth running from the circumference inwardly, a support adjustable longitudinally of said teeth, and a block mounted for oscillation in said support and equipped with pallets, the pallets of the said block being adapted as the disk rotates alternately to be engaged and released by said teeth.

2. A retarding device for gears, comprising a rotary disk formed on its opposite surfaces disposed transversely of the axis of the disk with concentric series of teeth running from the circumference inwardly, a member in the form of an escapement straddling said disk and adapted alternately to engage the teeth on opposite surfaces of the disk, and means for shifting said member longitudinally of said teeth.

3. A retarding device for gears, comprising a rotary disk formed on its surface disposed transversely of the axis of the disk with a concentric series of teeth running from the circumference inwardly and tapering from the circumference inwardly, a member in the form of an escapement adapted alternately to engage and release said teeth, and means for shifting said member longitudinally of said teeth.

4. A retarding device for gears, comprising a rotary disk formed on its opposite surfaces disposed transversely of the axis of the disk with concentric series of teeth running from the circumference inwardly, the teeth on opposite faces of the disk being displaced relatively to each other a distance corresponding to one half of the breadth of the teeth, and an oscillatory bifurcated member straddling said disk and having its arms in a plane perpendicular to said disk and adapted alternately to engage the teeth on opposite faces of the disk.

5. A retarding device for gears, comprising a rotary disk shaped in circumferential direction in zig-zag form to provide teeth on its opposite faces extending from the circumference of the disk inwardly, a support adjustable longitudinally of said teeth, and a bifurcated block mounted for oscillation in said support, straddling said disk, and adapted alternately to be engaged by the teeth on the opposite faces of the disk.

6. A retarding device for gears, comprising a rotary disk formed on its surface disposed transversely of the axis of the disk with a plurality of concentric series of teeth of different numbers running from the circumference inwardly, a member in the form of an escapement adapted alternately to engage and release said teeth, and means to shift said member inwardly and outwardly relatively to said disk and into position for engaging any one of said series of teeth.

7. A retarding device for gears, comprising a rotary disk formed on its surface disposed transversely of the axis of the disk with a plurality of concentric series of teeth of different numbers running from the circumference inwardly, the teeth of the inner series being extended outwardly to form a part of the teeth of the next series, a member in the form of an escapement adapted alternately to engage and release said teeth, and means to shift said member inwardly and outwardly relatively to said disk and into position for engaging any one of said series of teeth.

8. A retarding device for gears, comprising a rotary disk formed on its opposite surfaces disposed transversely of the axis of the disk with a plurality of concentric series of teeth of different numbers running from the circumference inwardly, an oscillatory bifurcated member disposed tangentially of said concentric series and straddling said disk for alternately engaging the teeth on opposite faces of the disk, and means for shifting said member in the direction of the said teeth and into position for engaging any one of said concentric series of teeth.

9. A retarding device for gears, comprising a rotary disk formed on its opposite surfaces disposed transversely of the axis of the disk with a plurality of concentric series of teeth of different numbers running from the circumference inwardly, a bifurcated member disposed tangentially of said concentric series and straddling said disk for alternately engaging the teeth on opposite faces of the disk, a pivot bolt on which said member is axially shiftable and rockingly mounted, a bail mounted on said pivot bolt and straddling said member, and means engaging said bail for shifting the same and the member in axial direction on the pivot bolt.

10. A retarding device for gears, comprising a rotary disk formed on its opposite surfaces disposed transversely of the axis of the disk with a plurality of concentric series of teeth of different numbers running from the circumference inwardly, a bifurcated member disposed tangentially of said concentric series and straddling said disk for alternately engaging the teeth on opposite faces of the disk, a pivot bolt on which said member is axially shiftable and rockingly mounted, a bail mounted on said pivot bolt and straddling said member, a cam disk engaging said bail, and means engaging said bail for shifting the same and the member in axial direction on the pivot bolt.

11. A retarding device for gears, comprising a rotary disk formed on its surface disposed transversely of the axis of the disk with a concentric series of teeth running from the circumference inwardly and with a concentric portion free of teeth, a member in the form of an escapement adapted alternately to engage and release said teeth, and means for shifting said member inwardly and outwardly relatively to said disk and into position for engaging said series of teeth and said portion free of teeth.

12. A retarding device for a train of gearing including, in combination with the train of gearing, a disk rotating in unison with the gearing, a support adjustable in its position in a direction that is radial with reference to said disk, and a block mounted on said support and movable in a direction that is transverse with reference to said disk, the disk being provided with surfaces of abutment obliquely disposed with reference to the line of advance of the rotating disk and of an extent (in the direction of such advance) that diminishes from the periphery toward the center of the disk, the parts being so proportioned and arranged that, as the disk rotates, its surfaces of abutment, engaging said block, move it in its support.

ÁRPÁD BARÉNYI.